United States Patent
Lindeman

(10) Patent No.: US 8,924,276 B2
(45) Date of Patent: Dec. 30, 2014

(54) REAL-TIME TRADE FORECASTER

(71) Applicant: Jacob C. Lindeman, Arlington, MA (US)

(72) Inventor: Jacob C. Lindeman, Arlington, MA (US)

(73) Assignee: FMR LLC, Boston, MA (US)

( * ) Notice: Subject to any disclaimer, the term of this patent is extended or adjusted under 35 U.S.C. 154(b) by 36 days.

(21) Appl. No.: 13/863,969

(22) Filed: Apr. 16, 2013

(65) Prior Publication Data

US 2013/0226835 A1 Aug. 29, 2013

Related U.S. Application Data

(63) Continuation of application No. 12/344,901, filed on Dec. 29, 2008, now Pat. No. 8,433,628.

(51) Int. Cl.
*G06F 9/30* (2006.01)
*G06Q 40/06* (2012.01)

(52) U.S. Cl.
CPC ..................................... *G06Q 40/06* (2013.01)
USPC .......................................... 705/36 R; 705/37

(58) Field of Classification Search
CPC ............................... G06F 9/30; G06F 9/30003
USPC ................................................. 705/36 R, 37
See application file for complete search history.

(56) References Cited

U.S. PATENT DOCUMENTS

| | | | |
|---|---|---|---|
| 6,915,390 B2 * | 7/2005 | Arimilli et al. ............... | 711/148 |
| 7,194,434 B2 | 3/2007 | Piccioli | |
| 7,707,091 B1 * | 4/2010 | Kauffman et al. .......... | 705/36 R |
| 2004/0093296 A1 | 5/2004 | Phelan et al. | |
| 2004/0181378 A1 | 9/2004 | Gillmore | |
| 2007/0016502 A1 | 1/2007 | Williamson et al. | |
| 2007/0156479 A1 | 7/2007 | Long | |
| 2008/0027841 A1 | 1/2008 | Eder | |

FOREIGN PATENT DOCUMENTS

| | | |
|---|---|---|
| JP | 11-259559 | 9/1999 |
| JP | 11345108 | 12/1999 |
| JP | 2003296476 | 10/2003 |
| JP | 2004126901 | 4/2004 |
| JP | 200883975 | 4/2008 |

OTHER PUBLICATIONS

Masayuki Ishinishi, et al., "A Study on the Transaction Mechanisms for Market-Based Model," IPSJ SIG Notes, the Information Processing Society of Japan, 2003 8(2003):81-86.

(Continued)

*Primary Examiner* — Daniel Felten
(74) *Attorney, Agent, or Firm* — Fish & Richardson P.C.

(57) ABSTRACT

Forecasting financial market activity includes a host system and a graphical processing unit in data communication with the server. Forecasting financial market activity also includes a computer program product residing on the host system, the computer program product including instructions for causing the host system to send one or more financial models to the graphical processing unit; and a computer program product residing on the graphical processing unit for causing the graphical processing unit to: receive the financial models and a list of types of market data associated with each financial model; generate one or more engine instances; structure the received market data; receive instructions, from the host system, to run an identified financial model; clone at least part of the structured market data; run the engine instances; and generate, in real time, forecast data indicative of an expected market performance.

33 Claims, 6 Drawing Sheets

(56) References Cited

OTHER PUBLICATIONS

Office Action in corresponding JP Application No. 2011-544470, dated Dec. 10, 2013, pp. 1-10.
PCT Notification of Transmittal of the International Search Report and the Written Opinion of the International Searching Authority, or the Declaration from PCT/US2009/068391, dated Nov. 26, 2010.

U.S. Appl. No. 12/344,901, filed Dec. 29, 2008, Ex Parte Quayle Office Action, dated Jun. 15, 2012, 5 pp.

U.S. Appl. No. 12/344,901, filed Dec. 29, 2008, Amendment and Reply to Ex Parte Quayle Office Action, dated Jul. 31, 2012, 10 pp.

* cited by examiner

_US 8,924,276 B2_

REAL-TIME TRADE FORECASTER

CLAIM OF PRIORITY

This application is a continuation of and claims priority under 35 U.S.C. §120 to U.S. patent application Ser. No. 12/344,901, filed Dec. 29, 2008, the entire contents of which are hereby incorporated by reference.

FIELD OF DISCLOSURE

The invention relates to financial forecasting, and in particular, to the use of a host system and co-processor hardware to output a real-time financial forecast.

BACKGROUND

Algorithmic trading includes collecting market data, applying an algorithm to the data to generate a forecast of financial market activity, and executing a trade based on the forecast. Algorithmic trading requires real-time processing and analysis of large amounts of financial data. However, the financial services industry struggles with absorbing large quantities of market data and running algorithms to forecast financial activity. Currently, there is a substantial time lag between the receipt of the market data and the generation of an algorithmic forecast of the financial marketplace. As a result, by the time the algorithm makes a forecast, the market has moved, rendering the forecast obsolete.

In many systems, a single machine, with a sole processor, both collects and processes the market data and executes algorithms on the processed data. Because these single machine systems lack the memory and processor speed necessary to take in and output large volumes of data in real time without a substantial time lag, these single machine systems cannot perform real time financial forecasting.

In one example of a single machine system, one computer receives market data and performs the algorithmic computations. However, this single computer is not able to perform real time algorithmic analysis of market data due to the limited speed of its processor. That is, by the time the single computer has processed all of the market data and generated a forecast, the market has already moved and the forecast is stale.

Even systems that are able to perform some real time analysis and forecasting, lose the ability to do so for extremely large quantities of data. For example, a system may be able to process 1000 megabytes ("megs") of market data in 10 milliseconds ("ms"). However, this system would not be able to process 8000 megs of market data in 10 ms.

Efforts to alleviate the time lags in algorithmic trading include locating the servers collecting the market data and generating the forecasts in close physical proximity to the sources of the market data, such as stock exchanges. For example, a server may be located across the street from a stock exchange in an effort to decrease the processing time of market data and thus reduce the time lag.

SUMMARY

In one aspect the invention features an apparatus for forecasting financial market activity. The apparatus includes a host system for receiving streamed market data indicative of financial market activity and a graphical processing unit in data communication with the server, wherein the graphical processing unit includes: processor memory for receiving, from the host system, the streamed market data. The apparatus also includes a computer program product residing on the host system, the computer program product including instructions for causing the host system to send one or more financial models to the graphical processing unit; and a computer program product residing on the graphical processing unit for executing financial models received from the host system against the market data received from the host system, the computer program product including instructions for causing the graphical processing unit to: receive the financial models and a list of types of market data associated with each financial model; generate one or more engine instances based on the received financial models and the list of types of market data associated with each model; structure the received market data according to a timestamp associated with the market data; receive instructions, from the host system, to run an identified financial model; clone at least part of the structured market data on the basis of the timestamps and the engine instances which are based on the identified financial model; run the engine instances which are based on the identified financial model to generate, in real time, forecast data indicative of an expected market performance, wherein the forecast data is at least partly based on the cloned market data; and output the forecast data indicative of an expected market performance.

In some practices the apparatus also includes more than one graphical processing unit in data communication with the server.

Other practices of the apparatus include instructions for causing the graphical processing unit to structure the received market data according to a ticker symbol associated with the market data.

Yet other practices of the apparatus include instructions for causing the graphical processing unit to perform one or more of the following: execute, in parallel, more than one financial algorithm against the selected data; update the selected data by overwriting first selected data with second selected data; transfer, to the server, the data indicative of an expected market performance; and allocate the memory on the graphical processing unit prior to receiving streamed data indicative of financial market activity.

Among the additional practices of the invention are those that include instructions for causing the graphical processing unit to perform one or more of the following: collect statistics regarding the processing of the received data; generate data structures for storing the received data; and run at least two engine instances at asynchronous times.

In another aspect, the invention features an apparatus for forecasting financial market activity, the apparatus comprising: a host system for receiving streamed market data indicative of financial market activity; co-processor hardware in data communication with the server, wherein the co-processor hardware includes: processor memory for receiving, from the host system, the streamed market data. The apparatus also comprises a computer program product residing on the host system, the computer program product including instructions for causing the host system to send one or more financial models to the co-processor hardware; and a computer program product residing on the co-processor hardware for executing financial models received from the host system against the market data received from the host system, the computer program product including instructions for causing the co-processor hardware to: receive the financial models and a list of types of market data associated with each financial model; generate one or more engine instances based on the received financial models and the list of types of market data associated with each model; structure the received market data according to a timestamp associated with the market data; receive instructions, from the host system, to run an identified financial model; clone at least part of the structured market data on the basis of the timestamps and the engine instances which are based on the identified financial model; run the engine instances which are based on the identified financial model to generate, in real time, forecast data indicative of an expected market performance, wherein the forecast data is at least partly based on the cloned market data; and output the forecast data indicative of an expected market performance.

In yet another aspect, the invention features an apparatus for forecasting financial market activity, the apparatus comprising a graphical processing that is an interface to a market data source, wherein the graphical processing unit includes processor memory for receiving streamed market data. The invention also includes a computer program product residing on the graphical processing unit for executing financial models against the market data, the computer program product including instructions for causing the graphical processing unit to: receive market data from the market data source; receive, from a host system, the financial models and a list of types of market data associated with each financial model; generate one or more engine instances based on the received financial models and the list of types of market data associated with each model; structure the received market data according to a timestamp associated with the market data; receive instructions to run an identified financial model; clone at least part of the structured market data on the basis of the timestamps and the engine instances which are based on the identified financial model; run the engine instances which are based on the identified financial model to generate, in real time, forecast data indicative of an expected market performance, wherein the forecast data is at least partly based on the cloned market data; and output the forecast data indicative of an expected market performance.

In another aspect, the invention features a computer-implemented method for forecasting financial market activity. The method includes receiving, on a graphical processing unit, streamed market data indicative of financial market activity; receiving financial models and a list of types of market data associated with each financial model; generating one or more engine instances based on the received financial models and the list of types of market data associated with each model; structuring the received market data according to a timestamp associated with the market data; receiving instructions, from a host system, to run an identified financial model; cloning at least part of the structured market data on the basis of the timestamps and the engine instances which are based on the identified financial model; running the engine instances which are based on the identified financial model to generate, in real time, forecast data indicative of an expected market performance, wherein the forecast data is at least partly based on the cloned market data; and outputting the forecast data indicative of an expected market performance.

In some practices, the method also includes one or more of the following: structuring the received market data according to a ticker symbol associated with the market data; executing, in parallel, more than one financial algorithm against the selected data; updating the selected data by overwriting first selected data with second selected data; and transferring, to the host system, the data indicative of an expected market performance.

Other practices of the forecasting method include one or more of the following: allocating the memory on the graphical processing unit prior to receiving streamed data indicative of financial market activity; collecting statistics regarding the processing of the received data, generating data structures for storing the received data, and running at least two engine instances at asynchronous times.

In another aspect, the invention includes a computer-readable medium having encoded thereon software for forecasting financial market activity. The software comprises instructions for causing a graphical processing unit to: receive, from a host system, streamed market data indicative of financial market activity; receive financial models and a list of types of market data associated with each financial model; generate one or more engine instances based on the received financial models and the list of types of market data associated with each model; structure the received market data according to a timestamp associated with the market data; receive instructions, from the host system, to run an identified financial model; clone at least part of the structured market data on the basis of the timestamps and the engine instances which are based on the identified financial model; run the engine instances which are based on the identified financial model to generate, in real time, forecast data indicative of an expected market performance, wherein the forecast data is at least partly based on the cloned market data; and output the forecast data indicative of an expected market performance.

Other embodiments have encoded thereon instructions for causing a graphical processing unit to perform one or more of the following: structure the received market data according to a ticker symbol associated with the market data; execute, in parallel, more than one financial algorithm against the selected data; update the selected data by overwriting first selected data with second selected data; and transfer, to the host system, the data indicative of an expected market performance.

Yet other embodiments of the computer-readable medium have encoded thereon instructions for causing a graphical processing unit to perform one or more of the following: allocate the memory on the graphical processing unit prior to receiving streamed data indicative of financial market activity; collect statistics regarding the processing of the received data; generate data structures for storing the received data; and run at least two engine instances at asynchronous times.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
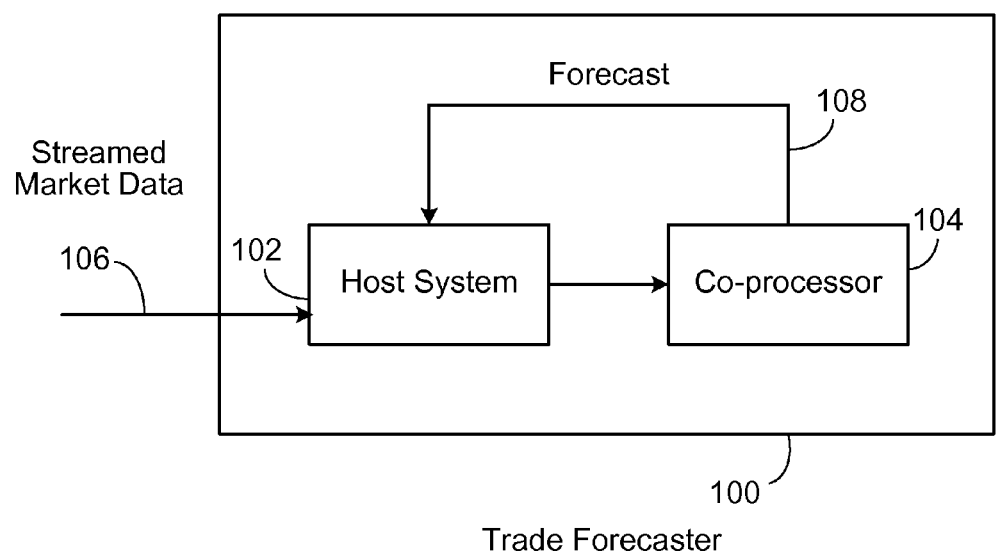
FIGS. 1 and 2 are diagrams of a trade forecaster.

A trade forecaster forecasts events about to occur in the financial markets and thus capitalizes instantaneously on market conditions. Referring to FIG. 1, the trade forecaster 100 includes a host system 102 and external co-processor hardware 104 that is coupled to the host system 102. Market data 106 is streamed into the trade forecaster 100 through the host system 102. The host system 102 transfers the market data 106 to the co-processor hardware 104. The co-processor hardware 104 fires (i.e., executes) trading algorithms that process the market data 106 and output a financial forecast 108 to the host system 102 in real time.

The host system 102 in combination with the co-processor hardware 104 provides a high-throughput and ultra-low latency trade forecaster 100. Coupling the co-processor hardware 104 with the host system 102 increases the computational speed of the trade forecaster 100 and enables the trade forecaster 100 to provide real time forecasts of financial market conditions.

Various types of co-processor hardware 104 may be coupled with the host system 102, including a hardware accelerator card or a graphics card. Hardware accelerator cards are commercially available and often include a dedicated clock and processor. Commercially available graphics cards, such as those manufactured by Nvidia or ATI Radeon, may also be used. In an exemplary embodiment, the trade forecaster 100 includes a graphics card. Graphics cards are optimized for the input and output of large volumes of streamed financial data, because of the several classes of dynamic random access memory (DRAM) included in a graphics card. Additionally, graphics cards are externally connected to, not tightly coupled with, the host system 102. In this example, a graphics card sitting on top of a rack mounted host system 102 is connected to the host system 102 by external wiring.

Depending on the amount of data to be processed, multiple co-processors 104 can be attached to a single host system 102. Because graphics cards are externally connected to a host system 102, more than one graphics card can be coupled to a host system 102.

Initialization Process

Figure 2:
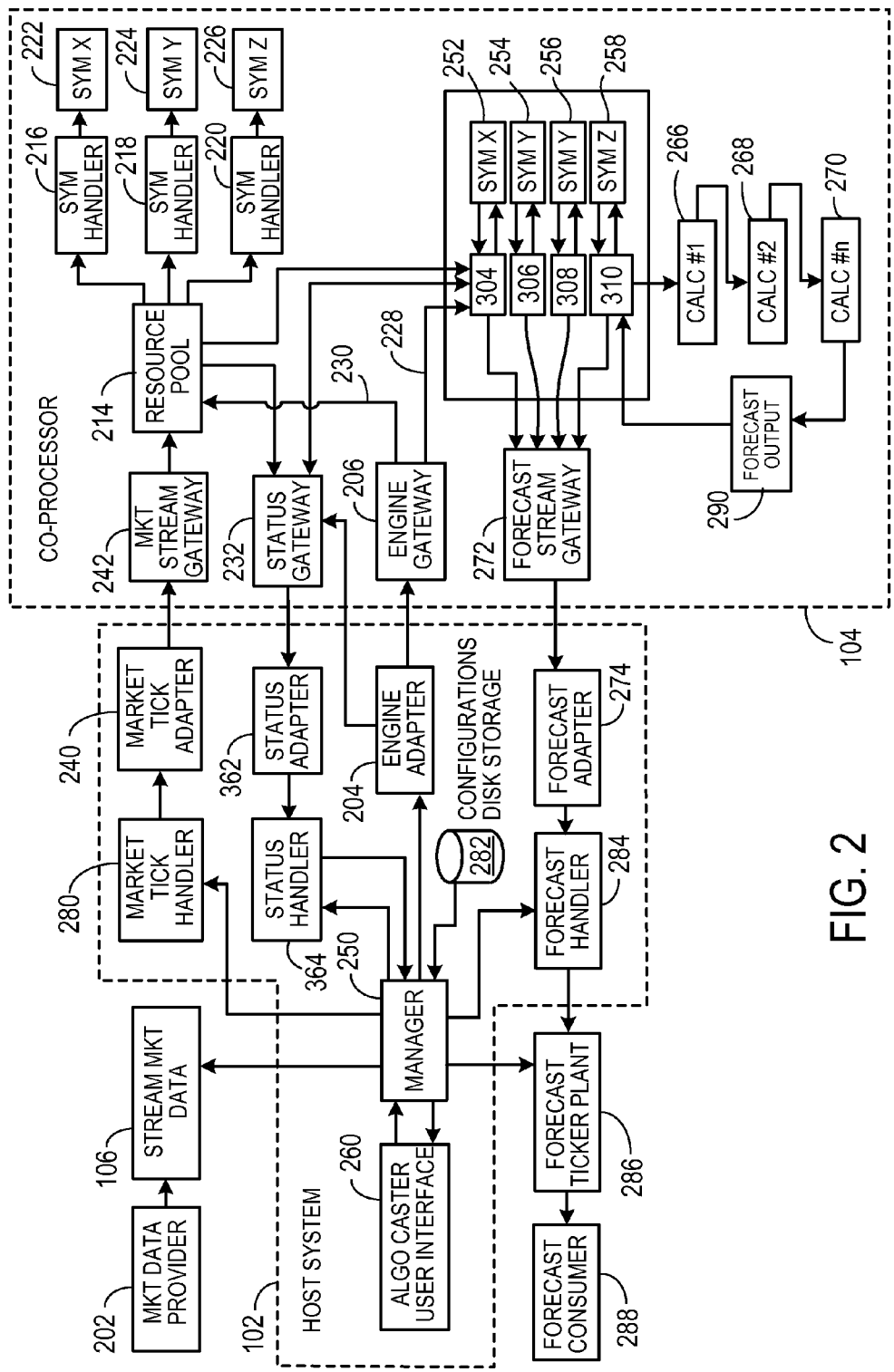

Upon being powered on, the trade forecaster 100 runs various initialization processes. In an exemplary embodiment, an initialization process is run once a day, in the morning and prior to the start of the trading day. Referring to FIG. 2, a configurations disk storage 282 "wakes up" the host system 102 by loading configuration programs, such as integer to ticker symbol mapping programs, into the host system 102. The host system 102 includes an engine adapter 204 to load information into the co-processor hardware 104. The co-processor hardware 104 includes an engine gateway 206 that receives information, such as financial algorithms, from the engine adapter 204. In one particular example, the engine gateway 206 receives from the engine adapter 204 a set of algorithms for the co-processor hardware 104 to fire.

Figure 3:
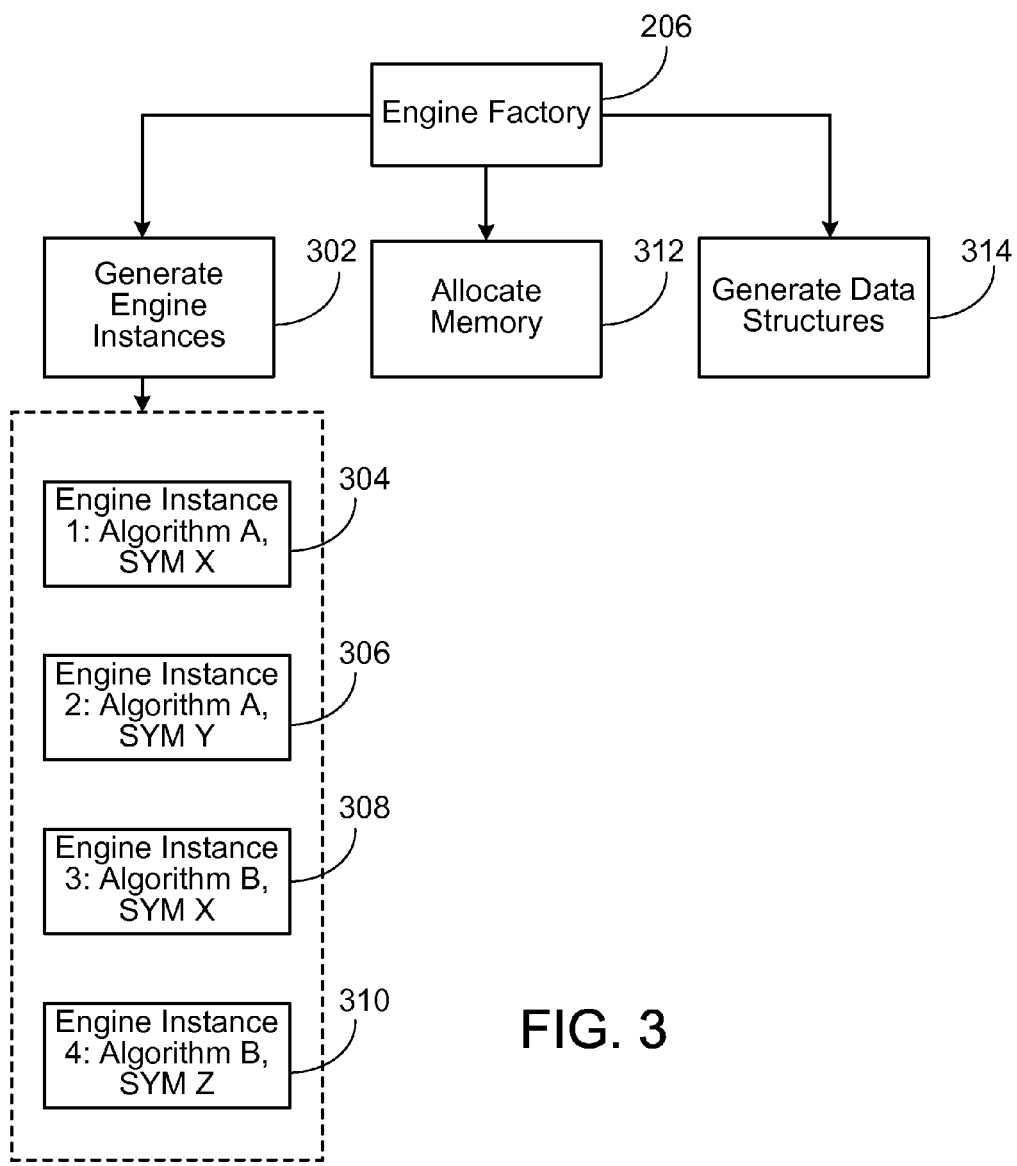
FIGS. 3 and 3A are flow charts of data structures.

The engine adapter 204 provides configuration parameters to the engine gateway 206 to initialize the resource pools 214 and symbol handlers 216, 218, 220. The engine adapter 204 associates resource pools 214 with the engine instances 304, 306, 308, 310 during the initialization process. Referring to FIG. 3, the engine gateway 206 generates engine instances 302, allocates memory 312, and generates data structures 314 during initialization.

Generation of Engine Instances

One of the initialization processes includes loading the algorithms into the co-processor hardware 104. An advantage of the trade forecaster 100 is that the algorithms are pre-loaded into the co-processor hardware 104 so that they can immediately be fired when the time comes to do so. This decreases the total time it takes the co-processor hardware 104 to generate a forecast 108 (hereafter referred to as "time-to-forecast").

Referring to FIG. 2, the engine adapter 204 on the host system 102 provides the algorithms to the engine gateway 206 on the co-processor hardware 104 so that they can be pre-loaded. By doing so, the host system 102 provides the co-processor hardware 104 with the algorithms that are expected to be fired that day. Because an algorithm is fired for a particular ticker symbol, the algorithms pre-loaded into the co-processor hardware 104 include a list of associated ticker symbols.

A ticker symbol identifies a security. For example, the Bank of America security is identified by a "BOA" ticker symbol. In one particular example, two algorithms, algorithm A and algorithm B, are loaded into the engine gateway 206. As shown in Table 1, below, algorithm A is associated with both ticker symbol X and ticker symbol Y. Algorithm B is associated with both ticker symbol Y and ticker symbol Z. In this example, the matrix depicted in Table 1 is provided to the engine gateway 206.

TABLE 1

| Algorithm | Ticker Symbol | | |
|---|---|---|---|
| | X | Y | Z |
| A | ☑ | ☑ | |
| B | | ☑ | ☑ |

Referring to FIG. 3, based on the received set of algorithms and associated ticker symbols, the engine gateway 206 generates engine instances 302. Each such engine instance is a data structure that includes the algorithm to be fired and the ticker symbol for which the algorithm should be fired. The algorithms are fired by running the engine instances. The number of engine instances generated by the engine gateway 206 depends on the number of algorithms and the number of ticker symbols associated with each algorithm. In the example of Table 1, there are two algorithms to be fired and each algorithm is associated with two ticker symbols. As a result, four engine instances 304, 306, 308 and 310 are generated. Engine instance 304 fires algorithm A for ticker symbol X. Engine instance 306 fires algorithm A for ticker symbol Y. Engine instance 308 fires algorithm B for ticker symbol Y. Engine instance 310 fires algorithm B for ticker symbol Z.

The engine gateway 206 is capable of generating many engine instances. For example, if one million algorithms are loaded into the co-processor hardware 104, and engine instances fire each algorithm for seven different ticker symbols, then the engine gateway 206 produces seven million engine instances.

Memory Allocation

Referring to FIG. 3, the engine gateway 206 also allocates memory 312 between the various processes running on the co-processor hardware 104. These processes include the resource pool 214 (FIG. 2), the status gateway 232, the symbol handlers 216, 218, 220, and the engine instances 304, 306, 308, 310. To optimize process speeds and decrease the time-to-forecast, the memory on the co-processor hardware 104 is pre-allocated prior to the processing of the streamed data 106. The engine gateway 206 allocates the co-processor hardware's memory 312 based on the amount of memory needed to run the engine instances. The engine adapter 204 provides the memory allocation parameters from host system 102 configuration files to the engine gateway 206.

Generation of Data Structures

The engine instances 304, 306, 308, 310 are not executable against the streamed, raw data 106 that is initially injected into the co-processor hardware 104. Therefore, the co-processor hardware 104 buffers and structures the data 106 prior to the execution of the engine instances 304, 306, 308, 310. One advantage of the trade forecaster 100 is that the streamed data 106 is buffered and structured on the co-processor hardware 104 and not on the host system 102. This decreases processing time and thus the time-to-forecast.

Referring to FIG. 3, the engine gateway 206 pre-defines the data structures that are to hold the received data 106. That is, the engine gateway 206 generates the data structures 314 prior to the firing of the algorithms to decrease processing time.

In one example, the streamed market data 106 is structured based on its ticker symbol and the time the data was originally produced. In another example, the streamed market data 106 is structured based on its associated unique integer value assigned by the market tick handler 280. However, even when the market data 106 is structured based on its unique integer value, the market data is still structured based on its ticker symbol, because each ticker symbol is associated with a unique integer value. Referring to FIG. 2, to structure the data 106 in this manner, the engine gateway 206 generates three types of structures: symbol handlers 216, 218, 220, symbol arrays 222, 224, 226, and time buckets (not shown).

The symbol handler 216, 218, 220 is a flow control that inserts new data 106 into the proper symbol array 222, 224, 226 based on ticker symbol. The symbol array 222, 224, 226 is a queued array of data 106 for a ticker symbol. The engine gateway 206 receives from the engine adapter 204 a list of all the ticker symbols for which data 106 is received (see Table 1). The engine gateway 206 generates a symbol handler 216, 218, 220 and a symbol array 222, 224, 226 for each symbol for which data is received. Each symbol is assigned a unique symbol handler 216, 218, 220 and a unique symbol array 222, 224, 226. Therefore, the total number of generated symbol handlers 216, 218, 220 and symbol arrays 222, 224, 226 depends on the total number of symbols processed by the co-processor hardware 104.

In one particular example, the co-processor hardware 104 processes all the symbols in the NASDAQ stock exchange, the NY stock exchange, over the counter ("OTC") securities, bonds, options and derivatives, totaling 8000 different ticker symbols. Therefore, the engine gateway 206 generates 8000 unique symbol handlers and 8000 symbol arrays, each symbol handler and symbol array corresponding to a ticker symbol.

Within a symbol array 222, 224, 226, data is time sorted into "time buckets" with each "bucket" representing a specified period of time. Time buckets are data structures that sort the data 106 based on the time the data was produced. Prior to generating the engine instances 304, 306, 308, 310 and receiving streamed data 106, the engine gateway 206 also pre-makes the time buckets. Each time bucket represents a period of time over which data 106 is collected. For example, a time bucket could represent a 1 second data collection interval or a 15 second data collection interval.

Figure 3A:
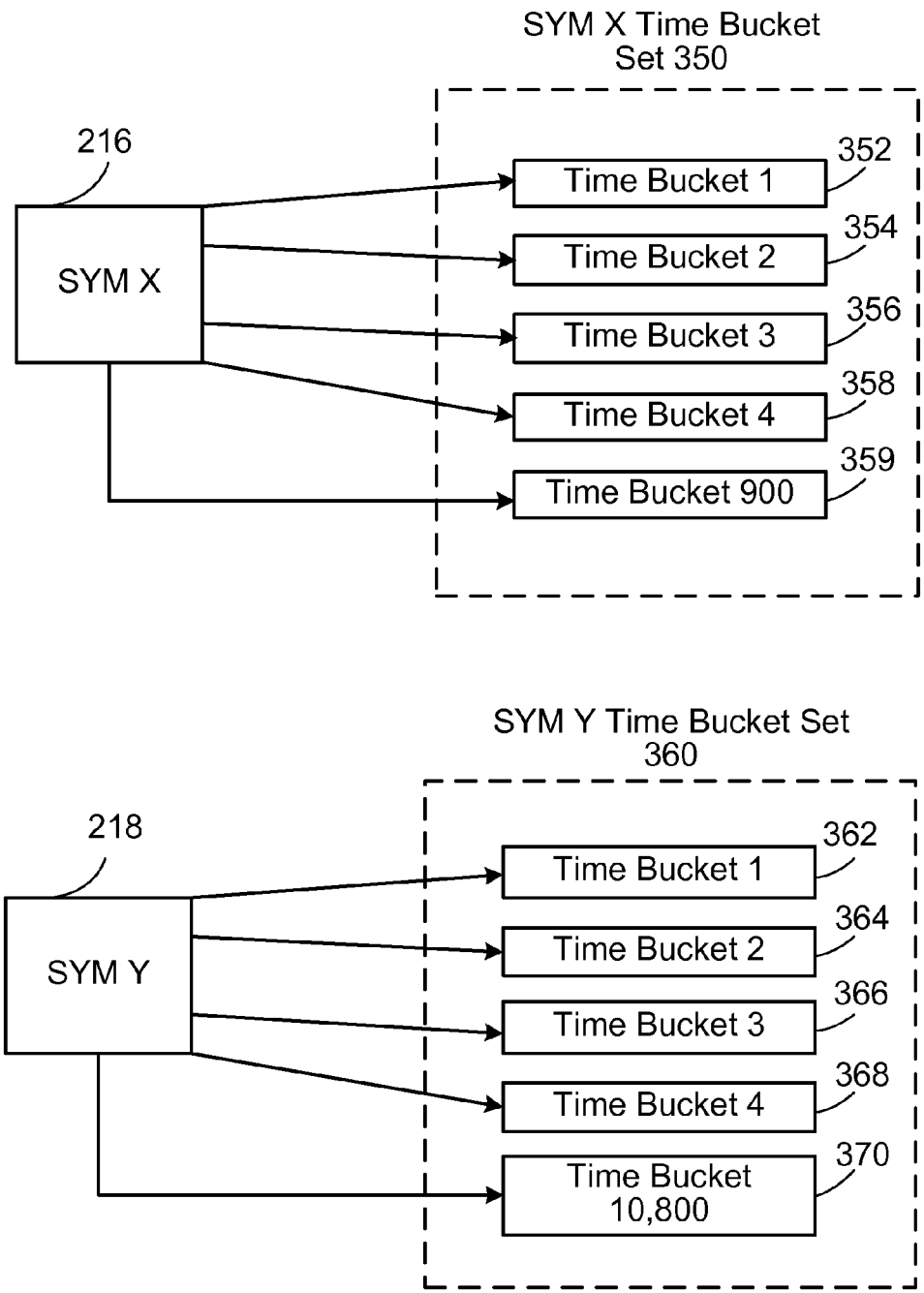

Referring to FIG. 3A, symbol array X 216 is associated with a set of time buckets 350. Symbol array Y is also associated with a set of time buckets 360. A time bucket set 350, 360 includes individual time buckets 352, 354, 356, 358, 359 and 362, 364, 366, 368. The number of time buckets depends on the amount of data needed by the algorithms when firing. In this example and referring to Table 1, an engine instance fires algorithm A for ticker symbol X. If algorithm A requires 15 minutes worth of data, and a time bucket is generated for each second worth of data collected, then time bucket set 350 includes 900 (15 min×60 sec=900) time buckets 352, 354, 356, 358, 359.

If more than one algorithm is fired for a ticker symbol, then the amount of data collected for that ticker symbol depends on the algorithm that requires the most data. For example, algorithms A and B both are fired for ticker symbol Y. Algorithm B requires 3 hours worth of data. Therefore, even though algorithm A only requires 15 minutes worth of data, 3 hours worth of ticker symbol Y data are collected. If a time bucket is generated for each second worth of data collected for ticker symbol Y, then time bucket set 360 includes 10,800 (3 hrs×60 min×60 s=10,800) time buckets 362, 364, 366, 368.

These data structures, including the symbol arrays 222, 224, 226 and the bucket sets 350, 360, reside in random access memory ("RAM") on the co-processor hardware 104. Because the data 106 is automatically inserted into these data structures and thus into random access memory ("RAM") on the co-processor hardware 104, an external database is not needed store the data. Due to this elimination of an external database, the trade forecaster 100 operates at ulta-low latency speeds and reduces the time-to-forecast.

Memory References

Referring to FIG. 2, the engine gateway 206 generates references 228, 230 to both the resource pool 214 and the engine instances 304, 306, 308, 310 prior to running the instances 304, 306, 308, 310. During the running of engine instances 304, 306, 308, 310, the engine instances 304, 306, 308, 310 request clones of part of or all of the symbol arrays 222, 224, 226. In one particular example, engine instance 304 requests a clone of symbol array X 222 and the resource pool 214 generates cloned symbol array X 252. The engine gateway 206 provides engine instance 304 with the memory location of symbol array X 222. This enables engine instance 304 to request a clone of symbol array X 222. Additionally, the resource pool 214 includes a reference to engine instances 304. This reference enables the resource pool 214 to transfer shared memory clone 252 of symbol array X 222 to engine instance 304.

Flow of Data

Figure 4:
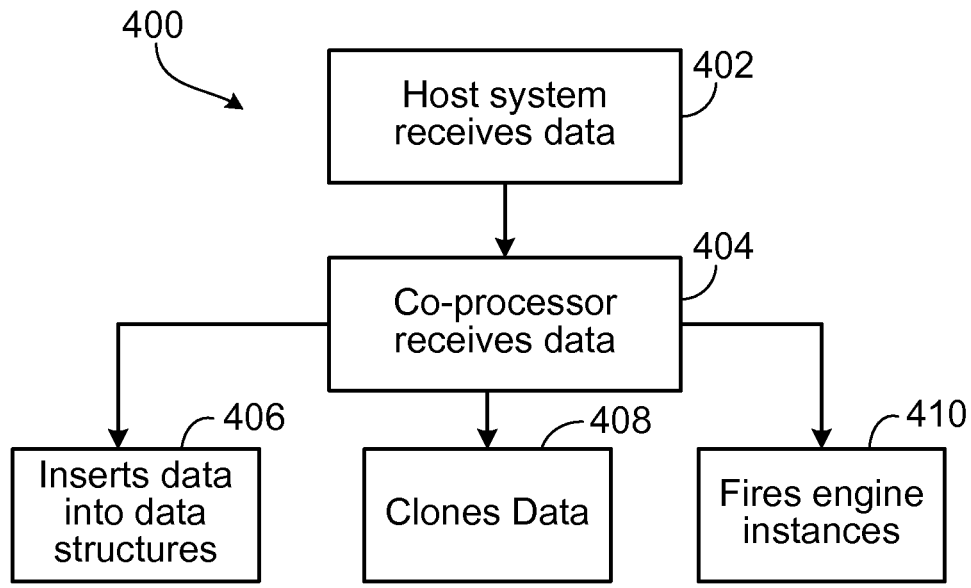
FIG. 4 is a flowchart of data flow from a host system to co-processor hardware.

Upon completion of the initialization process, data 106 is streamed into the trade forecaster 100 and the trade forecaster 100 performs various steps 400, some of which are shown in FIG. 4. Among these steps is one in which the host system receives streamed data (step 402) and another in which it passes the streamed data to the co-processor hardware (step 404). The co-processor hardware 104 performs the steps of inserting the data into the pre-defined data structures (step 406), cloning the data (step 408), and generating the engine instances (step 410).

Host system and Co-processor Hardware Receive Data

Referring back to FIG. 2, the host system 102 receives streamed financial market data 106 from a market data provider 202. Types of market data 106 include, but are not limited to, bid prices, ask prices and trade volumes. The host system 102 then prepares the market data 106 for injection into the co-processor hardware 104. It does so by processing the market data through the market tick handler 280 that assigns a unique integer value to each unique market data symbol for later use throughout the trade forecaster 100. Market data symbols are mapped to integer values in order for the data structures in the co-processor hardware 104 to be efficiently generated and processed. The market tick handler 280 maintains a mapping of the integer values to the corresponding market data symbol. In some examples, this mapping is hosted on the host system 102 such that when the forecast output 290 is relayed from the co-processor hardware 104 back to the host system 102 that the host system 102 re-associates the market data symbol with the market data 106. A market tick adapter 240 receives from the market tick handler 280 the market data with the integer assignment and issues the commands to upload the market data into the market stream gateway 242.

After having been processed by the host system 102, the data is injected into the co-processor hardware 104. One of the advantages of the trade forecaster 100 is that many of the functions typically carried out on a host system 102, such as buffering and data handling, are instead carried out on the co-processor hardware 104.

Another advantage of the trade forecaster 100 is that it is able to process large amounts of market data in real time and thus generate a forecast before the market moves. Another advantage of the trade forecaster 100 is its ability to process large volumes of market data quickly enough to generate a real-time forecast.

Insertion Into the Data Structures

Upon injection into the co-processor hardware 104, the market stream gateway 242 receives the data, appends a timestamp to the data and passes it onto the resource pool 214. The market stream gateway 242 receives the data from the host system 102 and assigns the market data into a resource pool 214 for insertion into the correct symbol handler 216, 218, 220 based upon the integer value. Use of the integer value by the resource pool 214 and symbol handler 216, 218, 220 provides significant processing performance benefits by allowing the market data 106 to be processed efficiently. References to market data within the co-processor hardware 104 use the integer value. In some examples, the market data symbol is passed into the co-processor hardware 104 for later use by the host system 102 when forecast data is returned from the co-processor hardware 104 to the host system 102. In other examples, the market data symbol resides on the host system 102, as previously discussed.

Referring to FIG. 4, the resource pool 214 (see FIG. 2) determines the ticker symbol associated with a piece of data and inserts the data into the correct data structure (step 406). This includes forwarding the piece of data to the symbol handler 216, 218, 220 that corresponds to the data's ticker symbol. Because, in some examples, the forecast data 106 is associated with a unique integer value, the symbol handlers 216, 218, 220 correspond to these unique integer values. Additionally, the resource pool 214 examines the timestamp associated with a piece of data and specifies the time bucket 352, 354, 356, 358, 359 and 362, 364, 366, 368 (FIG. 3A) that the data should be inserted into within the appropriate symbol array 222, 224, 226.

The time buckets 352, 354, 356, 358, 359 and 362, 364, 366, 368 are continuously updated with new data and purged of old data. One advantage of the time buckets 352, 354, 356, 358, 359 and 362, 364, 366, 368 is that one can easily overwrite the oldest data is easily overwritten without first having to search for the oldest data. In the above example, algorithm A requires 15 minutes worth of data before firing. Therefore, ticker symbol data that is only being used for algorithm A is overwritten with new data after 15 minutes of data collection. Referring to Table 1, ticker symbol X data is only used for algorithm A. Therefore, the oldest ticker symbol X data, namely data that was collected more than 15 minutes ago, begins to be overwritten after 15 minutes of data collection. However, ticker symbol Y data is collected for both algorithm A and algorithm B. As previously discussed, algorithm B requires 3 hours worth of data collection to be fired by an engine instance. Therefore, ticker symbol Y data begins to be overwritten with new ticker symbol Y data after 3 hours of data collection and not after only 15 minutes of data collection.

Another advantage of the time buckets 352, 354, 356, 358, 359 and 362, 364, 366, 368 is that they allow for the classification of variable length data. When data 106 fails to enter the host system 102 in a continuous stream, the update rate of the financial data in the time buckets 352, 354, 356, 358, 359 and 362, 364, 366, 368 is not consistent. A time based classification system, such as the time buckets, 352, 354, 356, 358, 359 and 362, 364, 366, 368, allows data to be classified in buckets depending on the data's timestamp and independent of the length of the data.

Another advantage to the time buckets 352, 354, 356, 358, 359 and 362, 364, 366, 368 is that data spanning a specified time interval can easily be identified when requested by the engine instances 304, 306, 308, 310. For example, at 3:00 pm, when engine instance 304 runs algorithm A against 15 minutes of ticker symbol X data, engine instance 304 may request all ticker symbol X data collected between 2:45 pm and 3:00 pm. In response, the co-processor hardware 104 simply queries all the time buckets 352, 354, 356, 358, 359 that hold data collected between 2:45 pm and 3:00 pm, thereby avoiding the need to scan through huge volumes of data.

Cloning of Data

Figure 5:
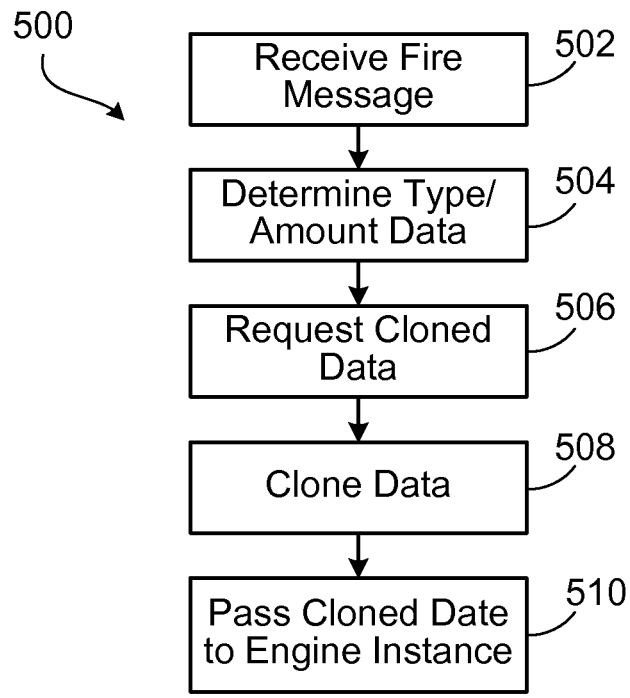
FIG. 5 is a flowchart of processes performed during data cloning.

Prior to the running of an engine instance 304, 306, 308, 310, the data used in firing the algorithm is cloned 408 (FIG. 4). Referring to FIG. 5, the co-processor hardware 104 performs various steps 408 in cloning the data for preparation of the running of an engine instance. Data cloning (step 408) is initiated by the receipt of a firing message (step 502). This firing message arises when a manager 250 (FIG. 2) located on the host system 102 sends a firing message to the engine adapter 204, which then relays the firing message to the engine gateway 206. A firing message specifies the time at which an engine instance 304, 306, 308, 310 runs and initiates the running of an engine instance 304, 306, 308, 310.

Upon receiving a firing message, the engine gateway 206 determines the amount of data and the ticker symbol of the data needed to run the engine instance (step 504). The amount of data depends on how much data an algorithm requires. For example, some algorithms will require 15 minutes worth of ticker symbol data, whereas other algorithms may require 3 hours worth of ticker symbol data. Using the reference 228 (FIG. 2) to the portion of memory that holds the needed ticker symbol data, the engine instance 304, 306, 308, 310 requests that the required data be cloned 506. It does so by sending a request to the resource pool 214 specifying the type and amount of required data.

In response, the symbol handler 216, 218, 220 clones the data 508 in the time buckets 352, 354, 356, 358, 359 and 362, 364, 366, 368 associated with the specified ticker symbol and included within the requested time interval. This results in cloning all or part of the symbol arrays 222, 224, 226. The contents of the symbol arrays 222, 224, 226 are constantly changing due to the continuous influx of market data 106 into the co-processor hardware 104. However, a data clone, which is essentially a snapshot of the data in the symbol arrays, is a static data set. For example, if algorithm A is run against ticker symbol X data collected in the last fifteen minutes, symbol handler X 216 clones the last fifteen minutes of data from the ticker symbol X time bucket set 350, generating a static set of ticker symbol X data.

After the data is cloned, the cloned data is passed to the engine instance 510 that requested the data. Referring to FIG. 2, each engine instance 304, 306, 308, 310 is associated with a cloned symbol array 252, 254, 256, 258. These engine instances 304, 306, 308, 310 use the cloned symbol arrays 252, 254, 256, 258 in the firing of the algorithms.

A benefit of cloning ticker symbol data on the co-processor hardware 104 is that the co-processor hardware 104 includes high speed memory buffers, without an operating system kernel. The resulting reduction in computational overhead reduces the time needed to clone the data and decreases the time-to-forecast.

One optimization technique includes cloning only the data needed to update the cloned symbol arrays 252, 254, 256, 258, instead of re-cloning the entire symbol array 222, 224, 226. For example, suppose engine instance 304 fires algorithm A, which only requires 15 minutes of ticker symbol data. If engine instance 304 fires algorithm A at 3:00 pm and fires algorithm A again at 3:01 pm, the last 15 minutes of data in the symbol handler 216, 218, 220 need not be re-cloned. Instead, the cloned symbol array 252 only needs to be updated with the most recent data collected between 3:00:00 to 3:00:59.

Figure 6:
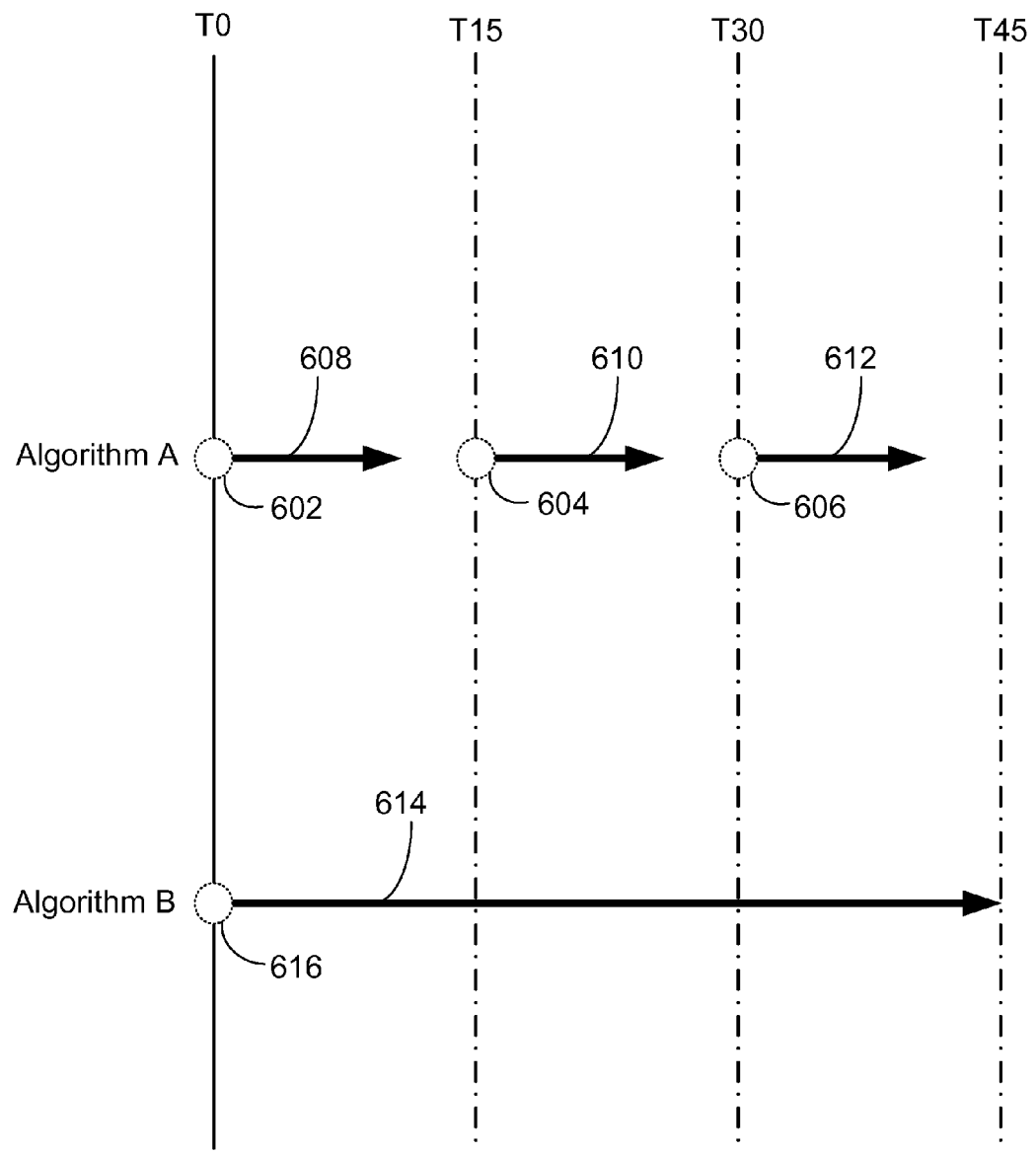
FIG. 6 is a diagram of an engine instance running and updating.

Additionally, the cloned symbol arrays 252, 254, 256, 258 update at various and sometimes differing times. Referring to FIG. 6, an engine instance fires algorithm A every fifteen minutes and fires algorithm B every hour. Because an engine instance updates prior to running, the cloned symbol array associated with algorithm A is updated three times 602, 604, 606 and algorithm A is fired three times 608, 610, 612 in forty-five minutes. In contrast, the cloned symbol array associated with algorithm B updates 614 only once and algorithm B is fired 616 only once in forty-five minutes.

Running the Engine Instance

Referring to FIG. 4, once the data has been cloned and the cloned symbol array 252, 254, 256, 258 passed to the engine instances 304, 306, 308, 310, the engine instances 304, 306, 308, 310 fire the appropriate algorithms. In some examples, the same algorithm is applied to different ticker symbols. In other examples, different algorithms are applied to different ticker symbols. The types of algorithms fired by the engine instances 304, 306, 308, 310 include standard industry algorithms, such as time weighted averages or volume weighted averages of trading activity, and proprietary or custom developed algorithms.

Because the co-processor hardware 104 is capable of running numerous engine instances 304, 306, 308, 310 at the same time, numerous algorithms are fired and executed in parallel against the market data 106. In one example, 8000 engine instances are generated. The co-processor hardware 104 runs these 8000 engine instances simultaneously. This results in the parallel execution of 8000 algorithms against the market data 106.

Output from an Engine Instance

In some examples, the forecast 108 from an engine instance 304, 306, 308, 310 is a single calculation, such as the average price of a security. In other examples, the forecast 108 depends on numerous, prior calculations. Referring to FIG. 2, engine instance 4 310, generates three calculations 266, 268, 270 where the third calculation 270 represents the forecast 108. However, the forecast 108 is dependent on calculation 266 and calculation 268.

Once the engine instance 304, 306, 308, 310 generates a forecast output 290, the engine instances 304, 306, 308, 310 return the forecast output 290 to the forecast adapter 274 on the host system 102. The forecast adapter 274 passes the forecast output 290 to the forecast handler 284. The forecast handler 284 formats the forecast output 290 for downstream consumers. In this step, the forecast handler 284 re-assigns a ticker symbol to the market data. The format of the forecast output 290 is customized for the external forecast ticker plant 286. The forecast ticker plant 286 then relays the forecast data to the forecast consumer 288.

The co-processor hardware 104 and the host system 102 interface through a forecast stream gateway 272 that passes the forecast 108 to the host system 102. A forecast adapter 274 moves the forecast 108 from the co-processor hardware 104 onto the host system 102 by buffering and storing the forecast 108 as the co-processor hardware 104 provides it. The forecast adapter 274 also transfers the buffered forecast 108 to the manager 250 for presentation to a user interface 260, in which the forecast 108 is presented in a viewable format.

Status Gateway

Referring to FIG. 2, a status gateway 232 collects statistics from the resource pool 214. The statistics include, but are not limited to, the different types of ticker symbol data the co-processor hardware 104 has received, or the number of time buckets held in memory. The resource pool 214 maintains a running inventory of the type and size of data 106 that is streamed into the co-processor hardware 104. The engine instances 304, 306, 308, 310 provide the status gateway 232 with statistics regarding the generation of forecasts 108, such as the number of engine instances 304, 306, 308, 310 running at a given time, the total number of forecasts 108 generated for a day and the compute timer performance speed of execution. Through the status gateway 232, the co-processor hardware 104 provides the host system 102 with statistics pertaining to the processing of data 106, without the co-processor hardware 104 having to re-scan through the time buckets to provide an update of the current types and sizes of data being processed. Additionally, when an engine instance 304, 306, 308, 310 is executed, a reference is sent to the status gateway 232 prior to execution. Upon the receipt of this reference, the status gateway 232 begins sending statistics to the status adapter 262 such as the number of time times the engine instances 304, 306, 308, 310 were fired and the number of times the engine adapter 204 requested that the engine instances 304, 306, 308, 310 fire.

The status gateway 232 outputs statistics to the host system 102. A status adapter 262 within the host system 102 receives the raw statistics and sends the statistics to a status handler 264. The status handler 264 formats the statistics for consumption by the manger 250. After the statistics have been formatted, they are transferred to the manager 250.

A number of embodiments of the invention have been described. Nevertheless, it will be understood that various modifications may be made without departing from the spirit and scope of the invention. In one particular example, the co-processor hardware 104 is an interface to a market data source. Accordingly, other embodiments are within the scope of the following claims.

What is claimed is:

1. An apparatus comprising:
    a graphics processing unit; and
    a computer readable storage device storing a computer program product, the computer program product comprising instructions for causing the graphics processing unit to:
        clone at least part of streamed market data for use in a financial model;
        execute the financial model using the cloned part of the streamed market data; and
        generate, in real time based on execution of the financial model using the cloned part of the streamed market data, forecast data indicative of expected market performance.

2. The apparatus of claim 1, wherein the computer program product further comprises instructions for causing the graphics processing unit to:
    order the streamed market data in accordance with a ticker symbol associated with the streamed market data.

3. The apparatus of claim 1, wherein the financial model is a first financial model and the computer program product further comprises instructions for causing the graphics processing unit to:
execute, while executing the first model, at least a second financial model using the cloned part of the streamed market data.

4. The apparatus of claim 1, wherein the computer program product further comprises instructions for causing the graphics processing unit to:
update the cloned part of the streamed market data with additional data from the streamed market data.

5. The apparatus of claim 1, wherein the computer program product further comprises instructions for causing the graphics processing unit to:
transmit the forecast data to a system that is requesting the forecast data.

6. The apparatus of claim 1, wherein the apparatus further comprises memory coupled to the graphics processing unit, and the computer program product further comprises instructions for causing the graphics processing unit to:
allocate memory for processing of the streamed market data prior to receiving the streamed market data.

7. The apparatus of claim 6, wherein the computer program product further comprises instructions for causing the graphics processing unit to:
generate data structures for storing the streamed market data in memory.

8. The apparatus of claim 1, wherein the forecast data is first forecast data, and wherein the computer program product further comprises instructions for causing the graphics processing unit to:
generate second forecast data with the first forecast data and the second forecast data being generated at asynchronous times.

9. The apparatus of claim 1, wherein instructions for causing the graphics processing unit to clone at least part of streamed market data for use in the financial model comprises instructions for causing the graphics processing unit to:
generate data indicative of a snapshot of data in symbol arrays in the streamed market data.

10. A computer readable storage device storing a computer program product, the computer program product comprising instructions for causing a graphics processing unit to:
clone at least part of streamed market data for use in a financial model;
execute the financial model using the cloned part of the streamed market data; and
generate, in real time based on execution of the financial model using the cloned part of the streamed market data, forecast data indicative of expected market performance.

11. The computer readable storage device of claim 10, wherein the computer program product further comprises instructions for causing the graphics processing unit to:
order the streamed market data in accordance with a ticker symbol associated with the streamed market data.

12. The computer readable storage device of claim 10, wherein the financial model is a first financial model and the computer program product further comprises instructions for causing the graphics processing unit to:
execute, while executing the first model, at least a second financial model using the cloned part of the streamed market data.

13. The computer readable storage device of claim 10, wherein the computer program product further comprises instructions for causing the graphics processing unit to:
update the cloned part of the streamed market data with additional data from the streamed market data.

14. The computer readable storage device of claim 10, wherein the computer program product further comprises instructions for causing the graphics processing unit to:
transmit the forecast data to a system that is requesting the forecast data.

15. The computer readable storage device of claim 10, wherein the apparatus further comprises memory coupled to the graphics processing unit, and the computer program product further comprises instructions for causing the graphics processing unit to:
allocate memory for processing of the streamed market data prior to receiving the streamed market data.

16. The computer readable storage device of claim 15, wherein the computer program product further comprises instructions for causing the graphics processing unit to:
generate data structures for storing the streamed market data in memory.

17. The computer readable storage device of claim 10, wherein the forecast data is first forecast data, and wherein the computer program product further comprises instructions for causing the graphics processing unit to:
generate second forecast data with the first forecast data and the second forecast data being generated at asynchronous times.

18. The computer readable storage device of claim 10, wherein instructions for causing the graphics processing unit to clone at least part of streamed market data for use in the financial model comprises instructions for causing the graphics processing unit to:
generate data indicative of a snapshot of data in symbol arrays in the streamed market data.

19. A method, comprising:
cloning, by a graphics processing unit, at least part of streamed market data for use in a financial model;
executing, by the graphics processing unit, the financial model using the cloned part of the streamed market data; and
generating, in real time based on execution of the financial model using the cloned part of the streamed market data, forecast data indicative of expected market performance.

20. The method of claim 19, further comprising:
ordering the streamed market data in accordance with a ticker symbol associated with the streamed market data.

21. The method of claim 19, wherein the financial model is a first financial model and wherein the method further comprises:
executing, while executing the first model, at least a second financial model using the cloned part of the streamed market data.

22. The method of claim 19, further comprising:
updating the cloned part of the streamed market data with additional data from the streamed market data.

23. The method of claim 19, further comprising:
transmitting the forecast data to a system that is requesting the forecast data.

24. The method of claim 19, wherein the graphics processing unit is included in an apparatus that comprises memory coupled to the graphics processing unit, and wherein the method further comprises:
allocating memory for processing of the streamed market data prior to receiving the streamed market data.

25. The method of claim 24, further comprising:
generating data structures for storing the streamed market data in memory.

26. The method of claim 19, wherein the forecast data is first forecast data, and wherein the method further comprises:
generating second forecast data with the first forecast data and the second forecast data being generated at asynchronous times.

27. The method of claim 19, wherein cloning at least part of streamed market data for use in the financial model comprises:
generating data indicative of a snapshot of data in symbol arrays in the streamed market data.

28. An apparatus comprising:
a processing unit; and
a computer readable storage device storing a computer program product, the computer program product comprising instructions for causing the processing unit to:
clone at least part of streamed market data for use in a financial model;
execute the financial model using the cloned part of the streamed market data;
generate, in real time based on execution of the financial model using the cloned part of the streamed market data, forecast data indicative of expected market performance; and
transmit the forecast data to a system that is requesting the forecast data.

29. The apparatus of claim 28, wherein the computer program product further comprises instructions for causing the processing unit to:
process the streamed market data.

30. A computer readable storage device storing a computer program product, the computer program product comprising instructions for causing a processing unit to:
clone at least part of streamed market data for use in a financial model;
execute the financial model using the cloned part of the streamed market data; and
generate, in real time based on execution of the financial model using the cloned part of the streamed market data, forecast data indicative of expected market performance; and
transmit the forecast data to a system that is requesting the forecast data.

31. The computer readable storage device of claim 30, wherein the computer program product further comprises instructions for causing the processing unit to:
process the streamed market data.

32. A method, comprising:
cloning, by a processing unit, at least part of streamed market data for use in a financial model;
executing, by the processing unit, the financial model using the cloned part of the streamed market data;
generating, in real time based on execution of the financial model using the cloned part of the streamed market data, forecast data indicative of expected market performance; and
transmitting the forecast data to a system that is requesting the forecast data.

33. The method of claim 32, further comprising:
processing the streamed market data.

* * * * *